United States Patent [19]
Koga

[11] Patent Number: 5,362,437
[45] Date of Patent: Nov. 8, 1994

[54] BLOW MOLDING METHOD

[75] Inventor: Kouhei Koga, Ueda, Japan

[73] Assignee: Nissei ASB Machine Co., Ltd., Nagano, Japan

[21] Appl. No.: 922,515

[22] Filed: Jul. 31, 1992

Related U.S. Application Data

[62] Division of Ser. No. 634,079, Dec. 26, 1990, Pat. No. 5,169,654.

[30] Foreign Application Priority Data

Dec. 29, 1989 [JP] Japan .................. 1-341140

[51] Int. Cl.$^5$ .............................................. B29C 49/06
[52] U.S. Cl. .................................... 264/537; 425/534
[58] Field of Search ............... 264/523, 537, 538, 535;
425/522, 533, 534

[56] References Cited

U.S. PATENT DOCUMENTS

| | | |
|---|---|---|
| 2,864,124 | 12/1958 | Strauss . |
| 3,048,890 | 8/1962 | Soubier . |
| 3,819,314 | 6/1974 | Marcus . |
| 4,140,464 | 2/1979 | Spurr et al. ............... 264/537 |
| 4,241,009 | 12/1980 | Sokolow ................... 264/535 |
| 4,321,029 | 3/1982 | Aoki . |
| 4,370,121 | 1/1983 | Valyi . |
| 4,391,578 | 7/1983 | Schaar ........................ 264/538 |

FOREIGN PATENT DOCUMENTS

| | | |
|---|---|---|
| 2389580 | 1/1978 | France . |
| 2394381 | 12/1979 | France . |
| 2394383 | 12/1979 | France . |
| 61-125833 | 6/1986 | Japan . |
| 1-18847 | 4/1989 | Japan . |
| 1152795 | 5/1969 | United Kingdom . |

Primary Examiner—Catherine Timm
Attorney, Agent, or Firm—Oliff and Berridge

[57] ABSTRACT

The present invention provides a blow molding process having the steps of conveying preforms to a blow molding stage while holding the preform by two rows of supporting plates, placing the preforms in two rows of blowing molds disposed corresponding to the supporting plates, blow molding the preform into hollow containers when tile blowing molds are in their closed positions, thereafter opening the blowing molds to remove the molded containers therefrom. On carrying out this blow molding process, the row pitch between the supporting plates is changed between one when the blowing molds are opened and another when the blowing molds are in the other conditions. By utilizing this process and an apparatus for carrying out the process, the row pitch between the supporting plates is not required to maintain the maximum pitch when the blowing molds are opened. Thus, the blow molding system may be reduced in size and occupying area.

7 Claims, 7 Drawing Sheets

F I G. 1
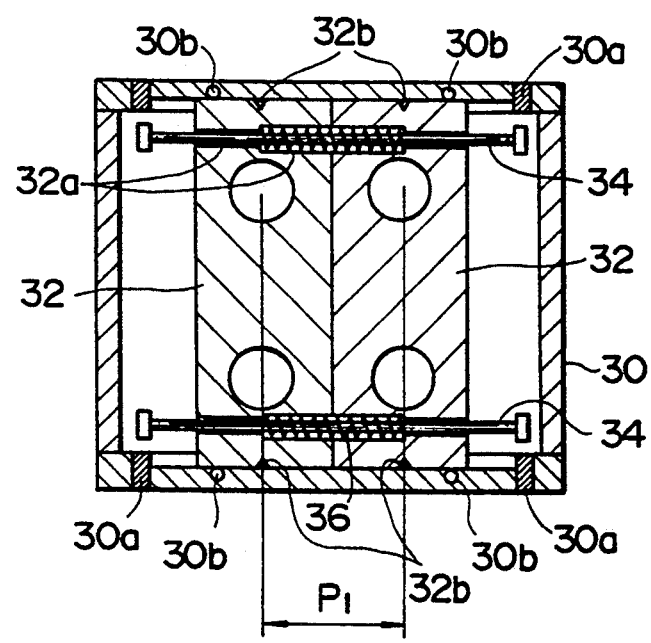
F I G. 2
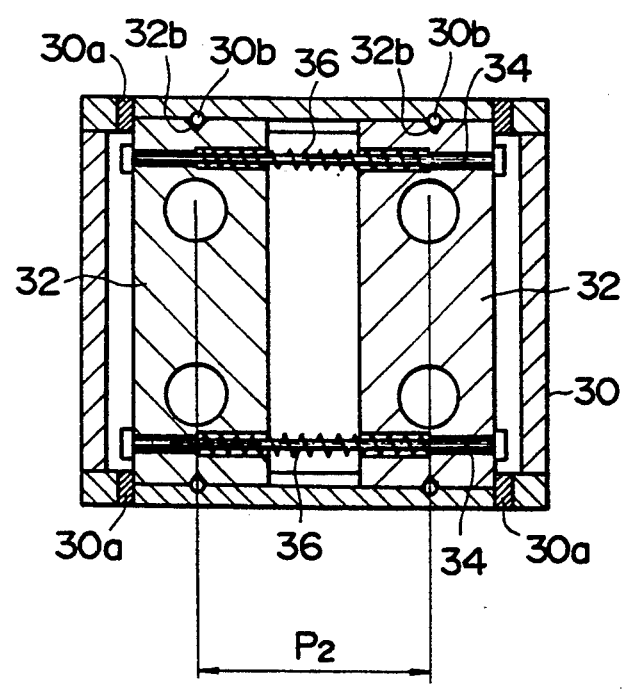

BLOW MOLDING METHOD

This is a division of application Ser. No. 07/634,079 filed Dec. 26, 1990, now U.S. Pat. No. 5,169,654.

BACKGROUND OF THE INVENTION

1. Field of the Invention

The present invention relates to a method and apparatus of blow molding a preform which has been previously formed by injection molding or extruding. Particularly, the present invention concerns a blow molding technique which utilizes molds arranged in two rows.

2. Description of the Related Art

In order to improve throughput, it is customarily performed in the blow molding technique that a plurality of hollow containers are simultaneously formed through one cycle including a series of steps such as injection molding step, blow molding step, ejecting step and other steps. One of the prior art systems for performing such a cycle comprises two rows of supporting plates for neck molds and two rows of blowing molds as described in Japanese Patent Publication No. 18847/1989. FIG. 9 is a cross-sectional view showing such a blow molding system which comprises an injection molding stage 10 for forming a preform and a blow molding stage 12 for forming a final product 22 from the preform. The system also comprises two rows of supporting plates 16 at each stage, each row of which are arranged spaced away from one another by a pitch P. Each of the supporting plates 16 holds one or more than two neck molds 14. The preform injection molding stage 10 includes two rows of injection-cavity molds 18 arranged opposed to the corresponding row of supporting plates 16 and spaced away from one another by the pitch P while the blow molding stage 12 includes two rows of blow-cavity molds 20 arranged opposed to the corresponding row of supporting plates 16 and spaced away from one another by the same pitch.

However, the pitch P between each row of supporting plates 16 must be selected to be relatively wide. This causes the entire system to increase in dimension because the pitch P must be determined to be compatible with the opening motion in the blow molding stage 12. More particularly, each of the blow-cavity molds 20 comprises a pair of mold halves 20a which are opened when a hollow product is to be removed out of the mold. Therefore, the magnitude of the pitch P is required to be equal to the total thickness of two inside mold halves 20a plus the movement of .the blow mold halves 20a on being opened. Simultaneously, each of the mold halves 20a must have a sufficient thickness to resist a given internal pressure (blowing pressure) without flexure. Thus, such a thickness in each mold half 20a will be added into the thickness of a backing plate (not shown) for supporting that mold half. This will cause the pitch P to increase.

For such a reason, the entire molding system cannot but increase in size and also occupy a larger space. Such a problem is exaggerated when it is wanted to form hollow containers having an increased diameter. Two rows of injection molds or temperature regulating sections can be arranged at most in alignment with the rows of blowing molds. In addition, this results in increase of conveying area.

SUMMARY OF THE INVENTION

It is therefore an object of the present invention to provide a blow molding method and apparatus which can reduce the entire size of the system while utilizing two rows of preform supporting plates so as to increase the throughput per one cycle.

To this end, the present invention provides a method of conveying preforms to a blow molding stage while supporting the preforms by two rows of supporting plates, placing each preform within the respective one blowing mold in two rows of blowing molds for two rows of supporting plates, closing each of the blowing molds to form a hollow product and opening the blowing mold to remove the hollow product, the improvement being characterized by the steps of providing two rows of supporting plates which are variable in row pitch; supporting the preforms by the respective supporting plates; and changing the row pitch from one to another in the blow molding stage.

The row pitch between two rows of supporting plates becomes the maximum value when the blowing molds are opened in the blow molding stage. If the row pitch can be changed from the maximum value to another smaller value, the row pitch between the supporting plates only in the blow molding stage may be increased when it is wanted to increase the row pitch for the opening. The row pitch between two rows of supporting plates may be decreased on conveying or in the other operating stage. This enables the entire system to reduce in size, in comparison with the prior art system which utilizes tile fixed row pitch between two rows of supporting plates.

Where each of the blowing molds includes a pair of mold halves, the First mold halves in tile blowing molds may be fixedly mounted on each other in a back-to-back manner, with each of the second mold halves being only moved. In such an arrangement, each of the first mold halves can have its thinned thickness sufficient to resist the blowing pressure. The center-to-center distance between two rows of blowing molds can be correspondingly reduced when the second mold halves are opened. Even though tile value of the row pitch on opening is applied to the row pitch between two rows of supporting plates on conveyance or in the other operating stage, the entire system can be reduced in size. In such a case, the row pitch between two rows of supporting plates is preferably decreased to be equal to the row pitch between two rows of blowing molds since only the first mold half is moved toward the second mold half on blow molding to reduce the row pitch between the rows of blowing molds.

Where a pair of mold halves are to be moved away from each other about the row pitch line in two rows of blowing molds, the fixed row pitch between the rows of blowing molds becomes substantially larger. If the system is constructed to be variable in row pitch, the row pitch can be increased only in the blow molding stage while the row pitch can be decreased on conveyance or in the other operating stage. This also contributes to reduction of the entire size of the system.

BRIEF DESCRIPTION OF THE DRAWINGS

FIGS. 1 and 2 are schematic views of one embodiment of a preform moving frame constructed in accordance with the present invention, with the pitch between each row of supporting plates being variable.

DETAILED DESCRIPTION OF THE PREFERRED EMBODIMENTS

Figure 3:
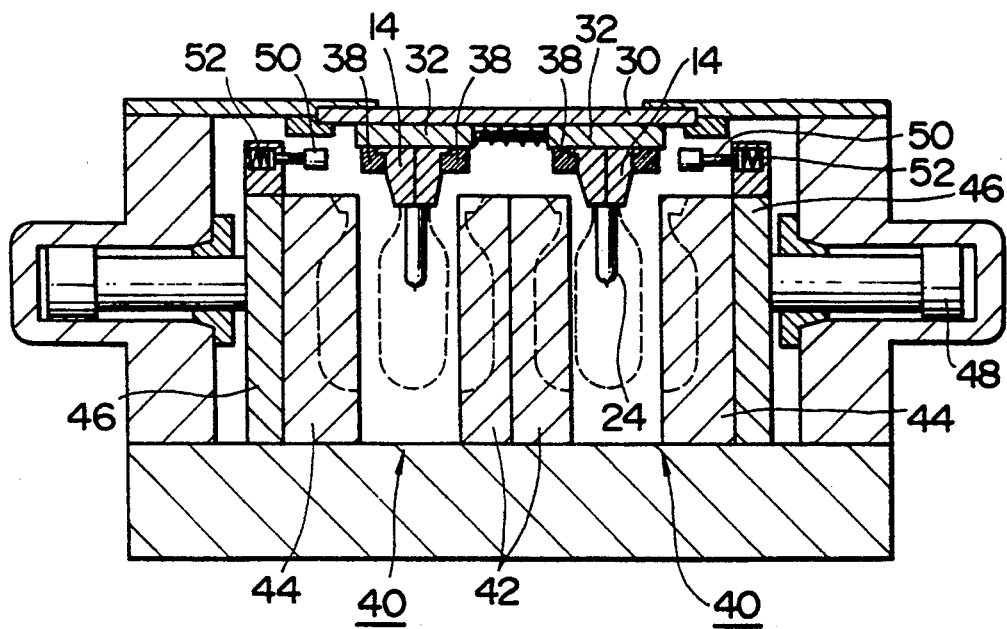
FIG. 3 is a schematically cross-sectional view of the blow molding system with tile blowing molds being opened.

The present invention will be described in connection with a biaxial orientation type blow molding process.

Referring to FIGS. 1 and 2, there is shown a neck-mold moving frame 30 which is of a square-like configuration and includes two rows of first neck-mold supporting plates 32 mounted therein such that the row pitch between these rows is variable. The row pitch can be changed between a first smaller pitch P1 and a second larger pitch P2. The moving frame 30 also includes four stoppers 30a formed therein adjacent to its four corners and four positioning members 30b for centering the supporting plates in the second pitch P2. The moving frame 30 further includes guide shafts 34 along which the two rows of supporting plates 32 are moved. Each of the guide shafts 34 extends through each of the supporting plates 32 at a through-hole 32a. Each through-hole 32a is stepped to form a shoulder. A coil-shaped compression spring 36 is located between the shoulders in the opposite through-holes 32a and slidably fitted around the corresponding one of the guide shafts 34 which extends through the through-holes 32a. Under the influence of each spring 36, the first neck-mold supporting plates 32 are biased to provide the second pitch P2. When the supporting plates 32 are set to have the second row pitch P2, the positioning members 30b engage into triangle-shaped grooves 32b formed in the respective first neck-mold supporting plates 32 at their end faces. When any external force is applied to the first neck-mold supporting plates 32 against the action of the springs 36, the supporting plates 32 may engage with each other at their opposed faces to realize the first pitch P1, for example. Alternatively, another stopper means may be provided for positioning the first neck-mold supporting plates 32 in the first pitch P1.

Figure 5:
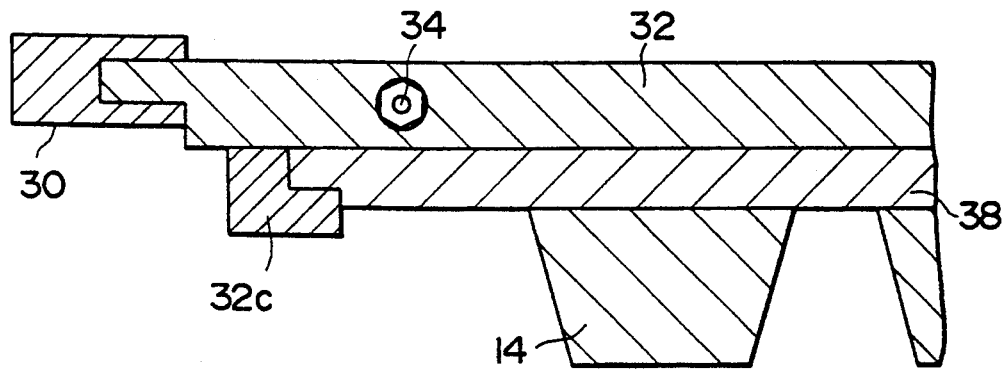
FIG. 5 is an enlarged view illustrating the relationship between first and second neck-mold supporting plates.

As shown in FIG. 5, the first neck-mold supporting plates 32 are mounted at their bottom on a guide rail 32c. The guide rail 32c slidably supports second openable neck-mold supporting plates 38 (also see FIG. 3). By opening and closing the second neck-mold supporting plates 38, the neck molds 14 (e.g. two for each plate) are opened and closed.

Figure 4:
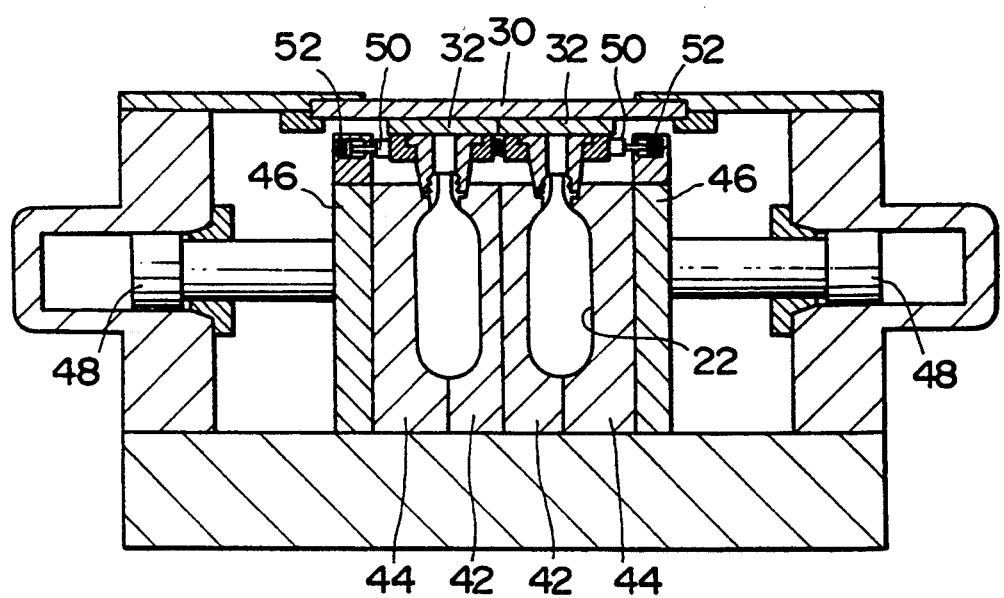
FIG. 4 is a schematically cross-sectional view of the blow molding system with the blowing molds being closed.

FIGS. 3 and 4 illustrate a biaxial orientation type blow molding stage into which the aforementioned neck-mold moving frame 30 is incorporated. The neck-mold moving frame 30 is so arranged that it is horizontally moved and guided by any suitable actuating mechanism which may be one as disclosed in U.S. patent application Ser. No. 07/559,266 or European Patent Application No. 90114722.3. Alternatively, a rotary conveyance type mechanism as disclosed in Japanese Patent publication No. 18847/1989 may be used herein.

Two rows of blowing molds 40 are provided for two rows of first neck-mold supporting plates 32. Each of the blowing molds 40 comprises a first mold half 42 fixed to another first mold half 42 in the other blowing mold in a back-to-back manner and a second mold half 44 which is movable relative to the stationary mold half 42. Each of the second mold halves 44 is rigidly connected with a movable block 46 which also serves as a reinforcing member resisting tile blowing pressure. Each of the movable blocks 46 is connected with a locking and driving mechanism 48.

Each of the movable blocks 46 fixedly supports, at its top, a pushing member 50 which is used to urge the corresponding one of the neck-mold supporting plates. Each of the pushing members 50 is connected with a damper spring 52 for absorbing an impact on actuation. The pushing members 50 are located at the same height whereat the second neck-mold supporting plates 38 are positioned.

In such an arrangement, one blow molding cycle is as follows:

Preforms 24 are Formed in an injection molding state (not shown) and then supported by the First neck-mold supporting plates 32. The preforms 24 are then regulated in temperature in a temperature regulating state (not shown) and thereafter conveyed to the biaxial orientation type blow molding stage. On conveyance, the row pitch between the rows of first neck-mold supporting plates 32 is set at the second pitch P2.

As seen From FIG. 3, the second pitch P2 is selected to be equal to a center-to-center pitch between two rows of First and second mold halves 42, 44 when they are opened. In each blowing mold 40, the second mold half 44 is movable while the first mold half 42 is stationary. Furthermore, the two first mold halves 42 in the adjacent blowing molds 40 are rigidly connected with each other in the back-to-back manner. Therefore, the first mold halves 42 can resist a given blowing pressure even if they have a decreased thickness. As a result, the present embodiment may have the second pitch P2 reduced in size, in comparison with the prior art blowing molds 20 having a center-to-center pitch P shown in FIG. 9.

In such a second pitch P2, the preforms may be conveyed and the injection molding cavity molds and temperature regulating pots and tile others may be arranged. Therefore, the entire system may be miniaturized correspondingly.

In the biaxial orientation type blow molding stage, the row pitch in the first neck-mold supporting plates 32 is set to be the second pitch P2 when the preforms are conveyed into tile blowing molds 40.

As shown in FIG. 3, the locking and driving mechanisms 48 are actuated after each of the preforms 24 has been placed between the first and second mold halves 42, 44 in one pair. As the movable blocks 44 are moved by the respective locking and driving mechanism 48, the second mold halves 44 are moved into their closed position. At the same time, the pushing members 50 are moved against the respective second neck-mold supporting plates 38. After the pushing members 50 engage the respective plates 38, the pushing members 50 moves the second movable supporting plates 38 to reduce the row pitch between the first and second supporting plates, against the action of the compression springs 36. After the locking has been completed as shown in FIG. 4, the first pitch P1 is set with the opposite ends of the first neck-mold supporting plates 32 being in contact with each other. Simultaneously, the first and second mold halves 42, 44 will be brought into intimate contact with each other in each blowing mold 40. This condition enables the biaxial orientation type blow molding process to be executed. Thus, each preform 24 will be formed into a hollow container 22 stretched in both the horizontal and vertical axes.

After the blow molding step, the locking and driving mechanisms 48 are again actuated in the opposite direction to move the second mold halves 44 into their opened position and to release the pushing members 50. Thus, the rows of first neck-mold supporting plates 32 are automatically returned to their original positions in the second pitch P2 under the action of the compression coil springs 36. As a result, hollow containers 22 may be removed out of the blowing molds 40 in the final or ejection step.

The opening and closing of the blowing molds 40 are performed only by driving the second mold halves 44. Therefore, the opening and closing mechanism may be simplified in construction and reduced in size.

It is to be understood that the present invention is not limited to the aforementioned arrangement and may be applied in various modifications or changes within the scope of the invention.

Figure 7A:
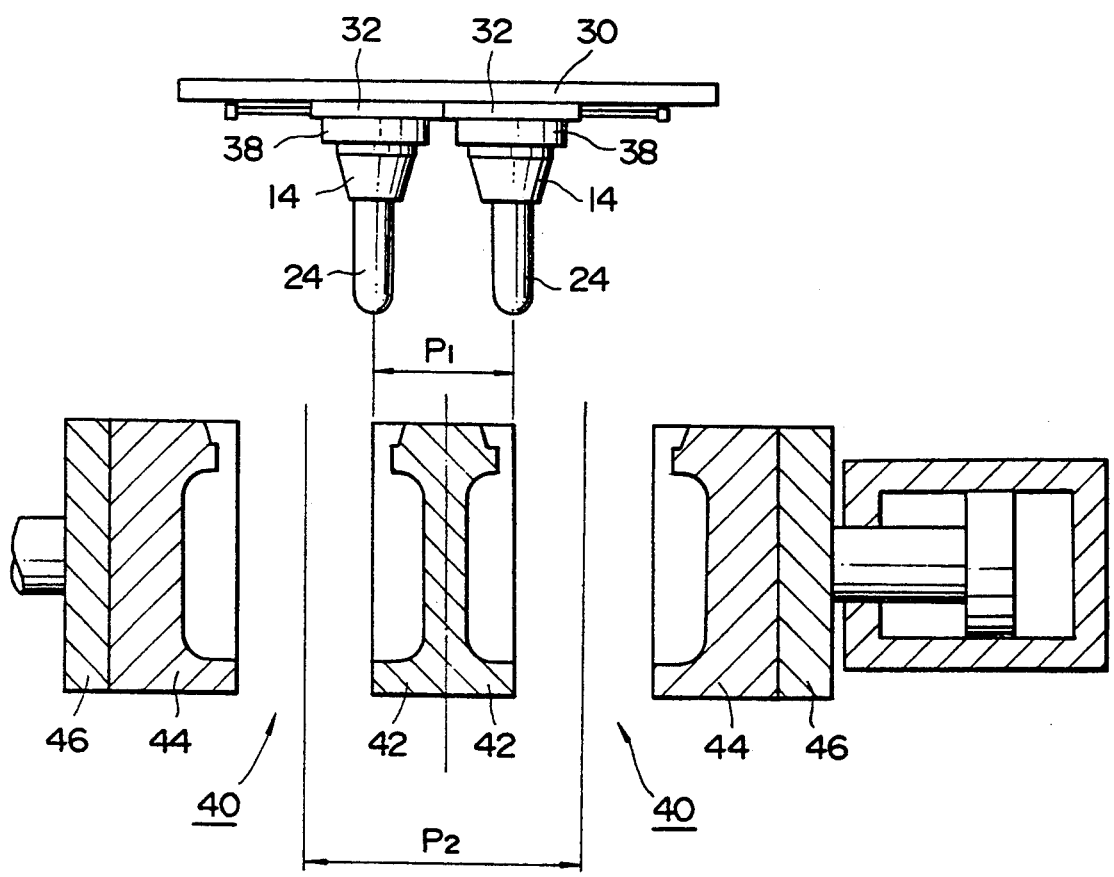
FIGS. 7(A) and 7(B) are schematic views illustrating another embodiment which has a different timing for changing the row pitch.
Figure 7B:
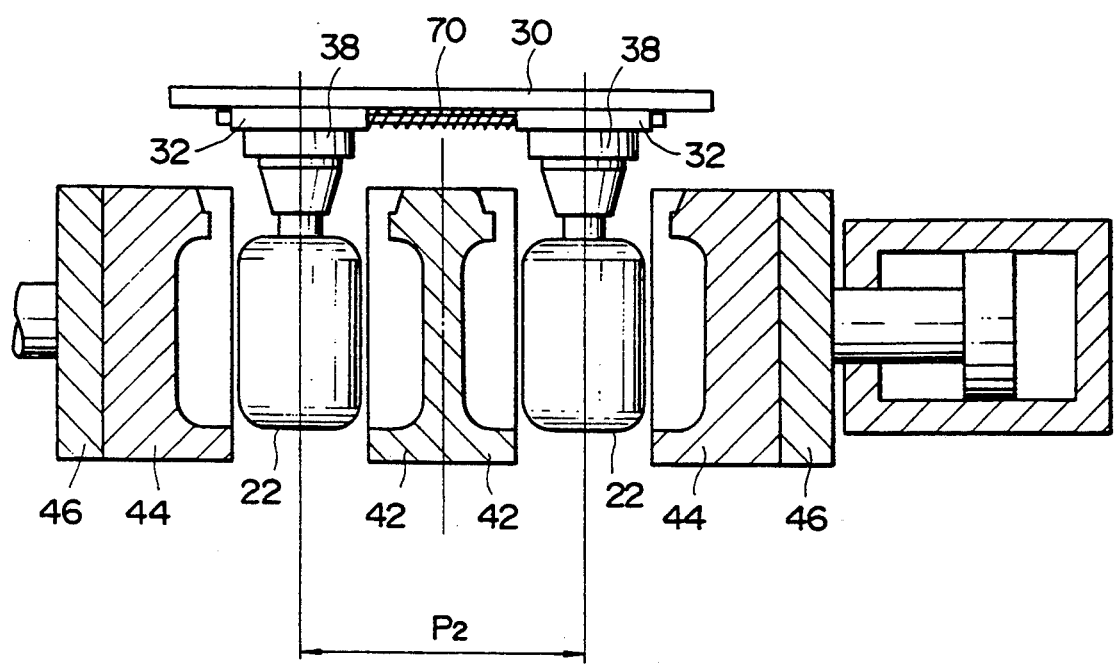

FIG. 7 shows another embodiment of a blow molding apparatus according to the present invention, in which the row pitch can be changed at a different timing. Referring to FIG. 7, each of blowing molds 40 is vertical movable between a position shown in FIG. 7(A) and another position shown in FIG. 7(B). On the upward movement, tile blowing mold 40 is opened such that a preform 24 can be placed therein. On the downward movement, the final product 22 can be removed from the blowing mold 40. Alternatively, supporting plates which hold preforms may be moved vertically.

First of all, the first pitch P1 is set. Under this condition, blow molding operation are carried out. When it is wanted to open the blowing molds, the second pitch P2 is set. After the final products 22 have been removed out of the molds, the row pitch is again set at the first pitch P1. During the steps before and .after the blow molding stage, the conveying and molding of preforms 24 can tie realized with the first pitch P1. Thus, the entire system can be reduced in size. In such a case, the rows of first neck-mold supporting plates 32 may be biased to set the second pitch P1 under the action of a coil-like tension spring 70. In order to set the second pitch P2, the first neck-mold supporting plates 32 may be moved away from each other against the action of the tension spring 70 by the use of any suitable drive mechanism. If done so, any external force will not be required to provide the first pitch P1 in the conveying or other step.

Figure 8B:
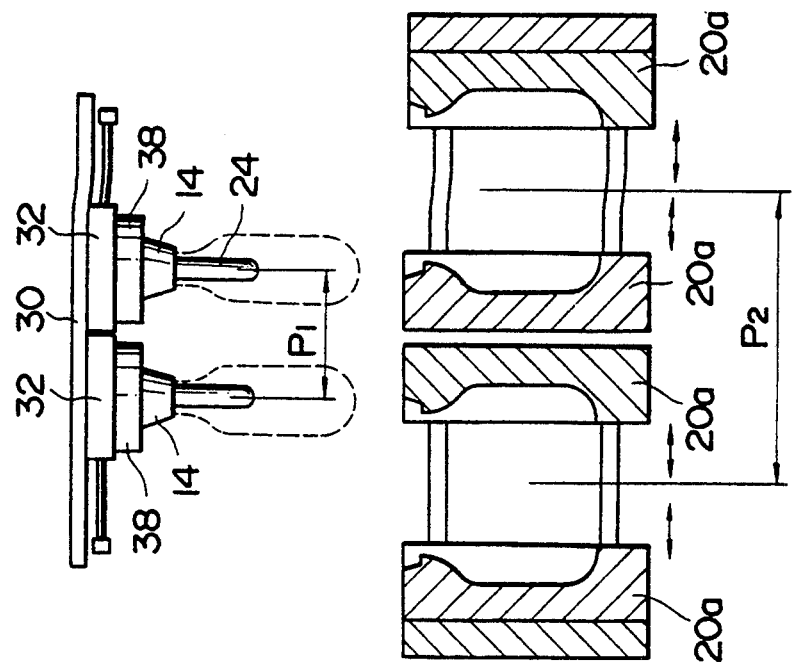
FIGS. 8(A) and 8(B) are schematic views of a further embodiment of the present invention which is applied to a blow molding stage including first and second movable mold halves in each blowing mold.
Figure 8A:
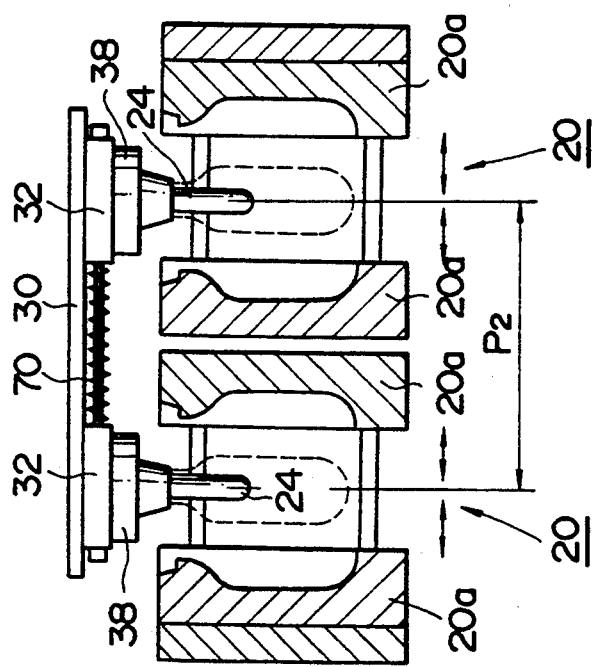
Figure 9:
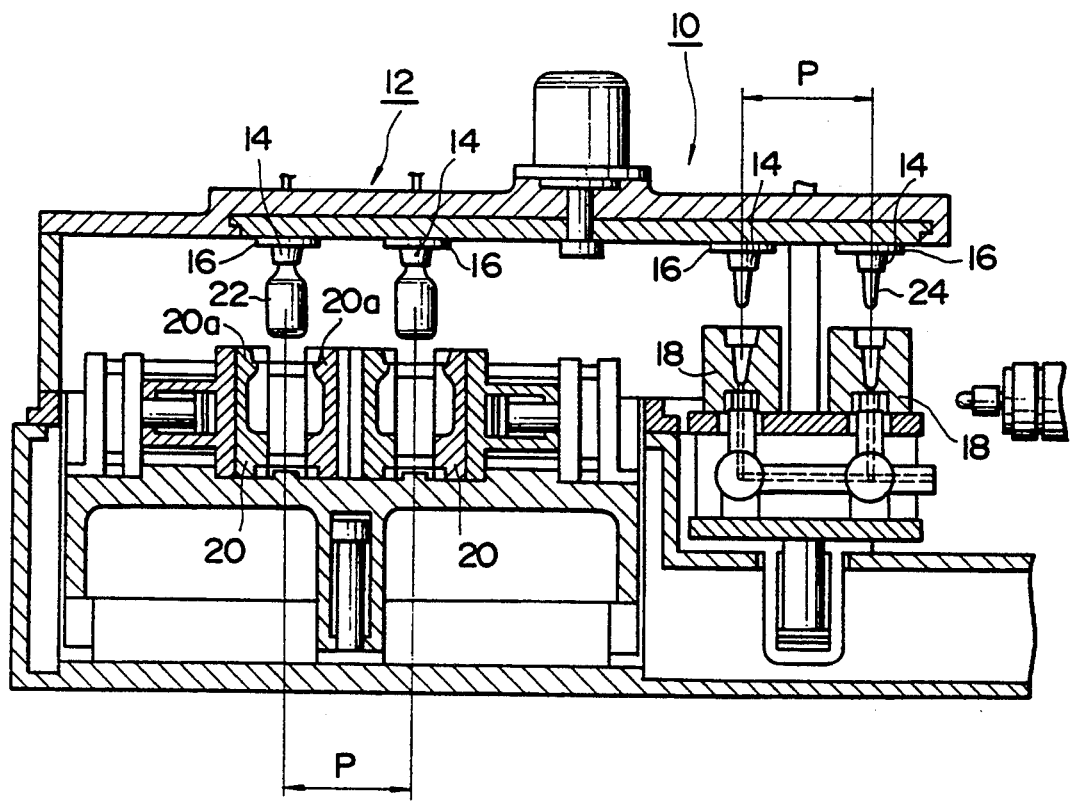
FIG. 9 is a schematically cross-sectional view of a prior art blow molding apparatus.

The present invention may be applied also to a blow molding system including blowing molds 20 each of which comprises a pair of mold halves 20a movable into their open position as shown in FIG. 9. Such an embodiment is shown in FIG. 8. Referring to FIG. 8, two rows of blowing molds 20 has a row pitch equal to the second pitch P2. During one cycle including preform placement, blow molding and final product removal, first neck-mold supporting plates 32 are set to have the same row pitch as that of the blowing mold rows, as shown in FIG. 8(A). In the conveying or other steps, the row pitch is set to be smaller than the second pitch P2 (i.e. the first pitch P1), as shown in FIG. 8(B). As a result, the size of the blow molding stage is maintained invariable, but the conveying path and other stages may be reduced in size. Even in such a case, it is preferred that the first neck-mold supporting plates 32 are biased to provide the first or smaller pitch P1 therebetween at all times, under the action of the tension spring 70.

Although the present invention is preferably applied to a blow molding system operated in a cycle having all the steps from the initial injection molding step to the final ejection step, it may be similarly applied to a so-called cold preform system operated with only two steps of regulating the temperature of a preform and blow molding the preform at a proper blowing temperature. In the latter case, such neck-mold supporting plates as described above will not be utilized and the row pitch between supporting plates for supporting preforms at their neck portions may be variable.

Figure 6A:
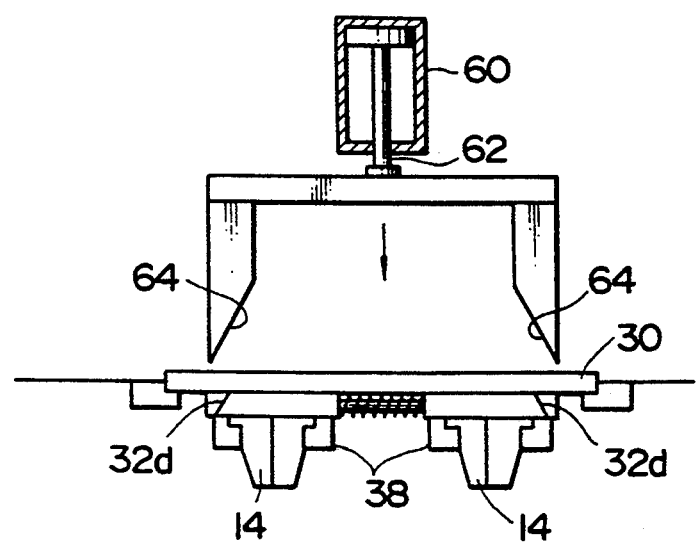
FIGS. 6(A) and 6(B) are schematic views illustrating a modification of the mechanism For changing the row pitch between two rows of supporting plates.
Figure 6B:
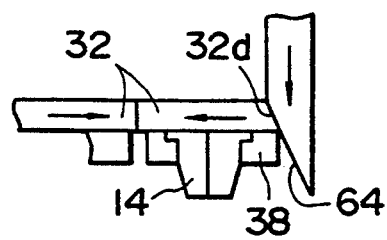

The aforementioned embodiments are not intended to limit any mechanism for changing the pitch in the supporting plate rows. FIG. 6 shows another mechanism for changing the row pitch by the use of tapered surfaces which are moved relative to each other. As seen from FIG. 6(A), each of the first neck-mold supporting plates 32 includes a tapered face 32d formed therein at one side edge and functioning as a cam follower. A plate closing cylinder 60 is disposed above the first neck-mold supporting plate rows 32. The cylinder 60 comprises a cylinder rod 62 which supports a slope cams 64 adapted to cooperate with the tapered faces 32d in the supporting plates 32. When the cylinder rod 62 is downwardly moved by the cylinder 60 before the second mold halves 44 are moved to their closed positions or in synchronism with the mold closing operation, the slope cams 64 cooperate with the respective tapered faces 32d in a surface contact manner to move the first neck-mold supporting plates 32 toward each other so that the first pitch P1 will be provided, as shown in FIG. 6(B).

I claim:

1. In a method of conveying preforms from an injection molding stage comprising rows of injection molds to a blow molding stage comprising rows of blowing molds, comprising the steps of:

placing each preform within a corresponding blowing mold in said rows of blowing molds; closing each of the blowing molds to form a hollow product; and opening each of the blowing molds to remove the hollow product, the improvement comprising the steps of:

providing rows of supporting plates which support the preforms and which are variable in row pitch;

injection molding the preforms and supporting the preforms with the rows of supporting plates having a row pitch between said rows set to be the same as the row pitch between the rows of said injection molds;

conveying said preforms to said blow molding stage while maintaining said row pitch between the rows of supporting plates to be the same as the row pitch between rows of the injection molds; and after said step of conveying, changing the row pitch between the rows of supporting plates from said row pitch to another larger row pitch, said row pitch being changed when said preforms or hollow products are within said blowing molds or during preform placement into said blowing molds.

2. The method as defined in claim 1 wherein each of said blowing molds comprises a first mold half fixed to another first mold half of the adjacent blowing mold in a back-to-back manner and a second mold half movable relative to the first mold half.

3. The method as defined in claim 1 wherein each of said blowing molds comprises a pair of mold halves movable away from and toward each other.

4. The method of claim 2, further comprising the step of setting a row pitch between rows of blowing molds at a first pitch when the blowing molds are closed and setting the row pitch at a second pitch larger than said first pitch when said blowing molds are opened and the hollow product is removed.

5. The method of claim 4, further comprising the step of setting the row pitch between said supporting plates at said first pitch when said blowing molds are closed and setting the row pitch between said supporting plates at said second pitch when said blowing molds are open and the hollow product is removed.

6. The method of claim 5, wherein the step of setting the row pitch between said supporting plates is interlocked with movement of said blowing molds so that the first pitch between said supporting plates is changed to said second pitch when said blowing molds are open.

7. The method of claim 3, wherein the row pitch of the rows of injection molds is a first pitch, a row pitch of the rows of blow molds is a second pitch larger than the first pitch, said row pitch of the rows of supporting plates at the changing step being changed from the first pitch to the second pitch.

* * * * *